US011662269B2

(12) United States Patent
Adams et al.

(10) Patent No.: US 11,662,269 B2
(45) Date of Patent: May 30, 2023

(54) FIBER-OPTIC INTERCONNECTION STABILIZATION APPARATUS

(71) Applicant: VIAVI SOLUTIONS INC., San Jose, CA (US)

(72) Inventors: Robert Matthew Adams, Ottawa (CA); Joshua Philipson, Ottawa (CA); Elias Debs, Ottawa (CA); Shauna Peach-Donovan, Ottawa (CA); Jeff Graves, Ottawa (CA)

(73) Assignee: VIAVI SOLUTIONS INC., Chandler, AZ (US)

( * ) Notice: Subject to any disclaimer, the term of this patent is extended or adjusted under 35 U.S.C. 154(b) by 104 days.

(21) Appl. No.: 17/152,512

(22) Filed: Jan. 19, 2021

(65) Prior Publication Data
US 2021/0148787 A1 May 20, 2021

Related U.S. Application Data

(62) Division of application No. 15/996,136, filed on Jun. 1, 2018, now Pat. No. 10,928,274.

(60) Provisional application No. 62/641,173, filed on Mar. 9, 2018.

(51) Int. Cl.
G02B 6/38 (2006.01)
G01M 11/00 (2006.01)

(52) U.S. Cl.
CPC ............ *G01M 11/33* (2013.01); *G02B 6/3897* (2013.01)

(58) Field of Classification Search
CPC ......... G01M 11/33; G02B 6/38; G02B 6/3897
USPC .......................................................... 385/92
See application file for complete search history.

(56) References Cited

U.S. PATENT DOCUMENTS

| | | | | | |
|---|---|---|---|---|---|
| 4,979,793 | A | * | 12/1990 | Bowen ................. | G02B 6/4246 250/227.16 |
| 5,125,056 | A | * | 6/1992 | Hughes ................ | G02B 6/3823 385/59 |
| 5,613,030 | A | * | 3/1997 | Hoffer .................. | G02B 6/4455 385/135 |
| 6,266,181 | B1 | * | 7/2001 | Ohishi ................... | C03C 3/122 359/341.1 |
| 6,439,776 | B1 | * | 8/2002 | Harrison .............. | G02B 6/3893 385/53 |
| 6,439,777 | B1 | * | 8/2002 | Harrison .............. | G02B 6/3827 385/53 |
| 6,454,464 | B1 | * | 9/2002 | Nolan ................... | G02B 6/3807 385/60 |
| 6,535,682 | B1 | * | 3/2003 | Puetz ................... | G02B 6/4452 385/137 |

(Continued)

Primary Examiner — Kaveh C Kianni
(74) Attorney, Agent, or Firm — Mannava & Kang, P.C.

(57) ABSTRACT

A fiber-optic interconnection stabilization apparatus for a measurement system is provided. The apparatus may comprise a main body comprising an enclosure and two openings. The enclosure may encase a fiber-optic cable within the main body in an organized manner. The two openings may fit connecting ends of the fiber-optic cable such that the connecting ends of may be exposed in order to connect two modular components of a measurement system and form a closed measurement loop. The main body, when in a closed configuration, may stabilizes the fiber-optic cable encased within from external conditions, such as mechanical, thermal, or other environmental conditions that may affect measurements.

13 Claims, 6 Drawing Sheets

(56) References Cited

U.S. PATENT DOCUMENTS

| | | | | |
|---|---|---|---|---|
| 6,556,763 B1* | 4/2003 | Puetz | | H04Q 1/13 385/134 |
| 7,406,242 B1* | 7/2008 | Braga | | G02B 6/4453 385/134 |
| 2002/0191937 A1* | 12/2002 | Knox | | G02B 6/4453 385/135 |
| 2003/0081874 A1* | 5/2003 | Yao | | G02F 1/0136 385/11 |
| 2003/0133686 A1* | 7/2003 | Delrosso | | G02B 6/4453 385/37 |
| 2004/0170369 A1* | 9/2004 | Pons | | G01M 11/3109 385/135 |
| 2007/0047895 A1* | 3/2007 | Parikh | | H02G 15/013 385/134 |
| 2007/0189695 A1* | 8/2007 | Bludau | | G02B 6/445 385/135 |
| 2008/0124020 A1* | 5/2008 | Niewczas | | G01D 5/35383 385/13 |
| 2008/0285933 A1* | 11/2008 | Vogel | | G02B 6/4452 385/135 |
| 2008/0298802 A1* | 12/2008 | Xia | | H04B 10/07955 398/40 |
| 2009/0097813 A1* | 4/2009 | Hill | | G02B 6/4454 385/135 |
| 2009/0245743 A1* | 10/2009 | Cote | | G02B 6/4454 385/135 |
| 2009/0269054 A1* | 10/2009 | Smith | | H04B 10/27 398/25 |
| 2009/0324189 A1* | 12/2009 | Hill | | G02B 6/46 385/135 |
| 2010/0142910 A1* | 6/2010 | Hill | | G02B 6/4454 385/135 |
| 2010/0316334 A1* | 12/2010 | Kewitsch | | G02B 6/3564 901/2 |
| 2011/0043793 A1* | 2/2011 | Xia | | H04B 10/07955 385/24 |
| 2016/0349472 A1* | 12/2016 | Clatanoff | | G02B 6/444 |
| 2017/0315307 A1* | 11/2017 | Lee | | G02B 6/3825 |
| 2018/0052289 A1* | 2/2018 | Lin | | G02B 6/421 |
| 2018/0202809 A1* | 7/2018 | Yao | | G01J 4/04 |
| 2018/0252887 A1* | 9/2018 | Coenegracht | | G02B 6/445 |

* cited by examiner

FIBER-OPTIC INTERCONNECTION STABILIZATION APPARATUS

PRIORITY

The present application is a Continuation of commonly assigned and U.S. patent application Ser. No. 15/996,136, filed Jun. 1, 2018, now U.S. Pat. No. 10,928,274 B2, which claims priority to U.S. Provisional Patent Application No. 62/641,173, entitled "Fiber-Optic Interconnection Stabilization Apparatus," filed on Mar. 9, 2018, which are incorporated by reference in their entirety.

BACKGROUND

Some network testing devices, especially those that measure and test insertion loss (IL), optical return loss (ORL), polarization dependent loss (PDL), and extinction ratio (ER), may be provided in single-box measurement platform. This network testing device will typically be preconfigured to include various modular testing components or cassettes. These may include a single output light source, standard connector adapters, one or more measurement elements, etc., within a single-bodied chassis. As a single testing unit, the network testing device may be able to handle most, if not all, measurement and testing determinations. For external sources not included in the network testing device, a fiber-optic cable (or jumper) may be used to connect the external source, or other modular system components to the network testing device.

In order to provide an interconnection between two modular testing components in the network testing device, a fiber-optic interconnect, for example, may be required to close a testing or measurement loop. However, a technical problem associated with such a configuration is that the fiber-topic interconnect is often exposed. This means the optical fiber may be affected by environmental elements, which in turn may lead to inaccurate measurements and readings by the network testing device. As a result, a fiber-optic interconnection stabilization apparatus may be needed.

BRIEF DESCRIPTION OF DRAWINGS

Features of the present disclosure are illustrated by way of example and not limited in the following Figure(s), in which like numerals indicate like elements, in which.

DETAILED DESCRIPTION

Figure 1:
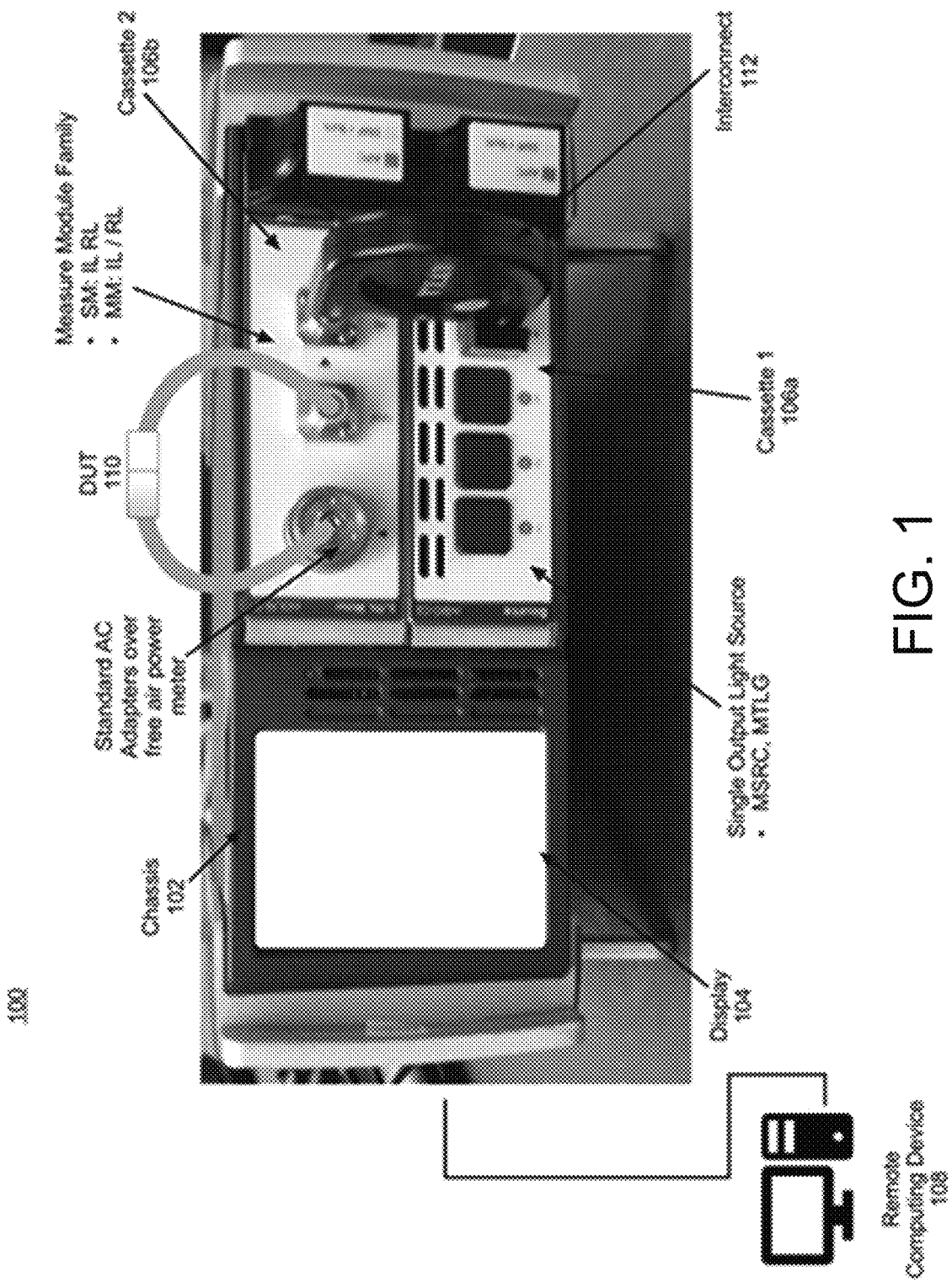
FIG. 1 illustrates a measurement system using a fiber-optic interconnect, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Measuring and comparing optical return loss (ORL) in a network has become increasingly important in network provisioning and maintenance. There are two general techniques for measuring optical return loss (ORL): (1) time-domain measurements, and (2) optical-continuous-wave reflectometry (OCWR). Despite differences in sensitivity between these techniques and how equivalent measurements are obtained, both techniques may be widely used for measuring ORL. The newer time-domain techniques, however, have recently become more popular because of their ease of use, speed, and dynamic range and capabilities.

Optical loss return (ORL) is the ratio between the light launched into a device and the light reflected by a defined length or region. For ORL measurements, regardless of method (e.g., time-domain reflectometry (TDR), optical-continuous-wave reflectometry (OCWR), or other technique), length is an important factor and it may be defined differently for each type of measurement technique. Reflections and scattering of light within fiber may affect data transmission and performance. Therefore, ensuring fiber-optic integrity of an interconnect, for example, may be essential to more accurate and reliable network testing and measurements.

As described above, current measurement devices that measure and test insertion loss (IL), optical return loss (ORL), polarization dependent loss (PDL), extinction ratio (ER), and/or other optical signals in a network may be provided in single-box measurement system. As a result, these network devices that contain a plurality of modular components or cassettes may often need a fiber-optic interconnect to close a measurement loop in order to perform a measurement or other determination. Because such a fiber-optic interconnect may be a single-mode (SM) optical fiber that is exposed to various environmental conditions. These conditions may be mechanical (e.g., twisting, pulling, turning, kinking, etc.) or thermal, or may be based on proximity to other forms of interference. As a result of these external perturbations or fluctuations, measurements by the network testing device may not be as accurate or reliable as they could be with a more stabilized fiber-optic interconnect. Accordingly, a fiber-optic interconnection stabilization apparatus is described herein.

FIG. 1 illustrates a measurement system 100 using a fiber-optic interconnect, according to an example. In an example, the measurement system 100 may be an ORL measurement system. Although examples described herein are generally directed to an ORL measurement system, it should be appreciated that the ORL measurement system 100 may also be used for measuring insertion loss (IL), optical return loss (ORL), polarization dependent loss (PDL), extinction ratio (ER), and/or run other optical signals or measurements. As depicted, the ORL measurement system 100 may be a single-box platform. In an example, the ORL measurement system 100 may include a chassis 102 containing a display 104 for a unified application. In an example, the ORL measurement system 100 may include a plurality of modular components. These modular components may be provided in cassette form (or other suitable form), which may be inserted into the chassis 102. In an example, the ORL measurement system 100 may include Cassette 1 106a and Cassette 2 106b. It should be appreciated that while only two cassettes 106a and 106b or modular components are shown, there may be more or less depending on chassis size or other predetermined configurations. In FIG. 1, Cassette 1 106a may be a single output light source (e.g., MSRC, MTLG, etc.), and Cassette 2 106b may be a measurement module family (e.g., single mode (SM): IL/RL (return loss), multimode (MM): IL/RL, etc.). Other various configurations may also be provided.

Cassette 1 106a and Cassette 2 106b, in this example, may include a variety of input/output ports and/or adapters. These may be for connecting power, cables, wires, or other inputs/outputs. In some examples, the ORL measurement system 100 may have at least an Ethernet connection to connect to other computing devices 108, such as a reporting tool or other system. Other various ports, adapters, connections may also be provided. Also as shown in FIG. 1, Cassette 2 106b may include ports or adapter to a fiber-optic cable (or jumper), which may be used to connect the ORL measurement system 100 to an external source. In an example, this external source may be a device under test (DUT) 110 or other network component in which measurements are to be measured and taken.

As shown in FIG. 1, Cassette 1 and Cassette 2 may be connected by a fiber-optic interconnect 112, which may be another fiber-optic cable. The fiber-optic interconnect 112 may be exposed to external conditions. These conditions may cause fluctuations and perturbations that may be mechanical, thermal, or other environment condition that may adversely affect potential measurements by the ORL measurement system 100. As described above, it may be important for an optical signal to be as stable as possible, especially for ORL measurements that involve parameters of IL and polarization stability. Therefore, as shown in FIG. 1, the fiber-optic interconnect 112 may be encased in a fiber-optic interconnect stabilization apparatus 200, which will be described in greater detail below.

In some examples, the interconnect 112 may be a polarization-maintaining (PM) optical fiber. A PM fiber may be a single-mode optical fiber in which linearly polarized light maintains a linear polarization during propagation. In other words, a PM fiber may allow light to exit with little or no cross-coupling of optical power between two polarization modes. A PM fiber may work to stabilize polarization fluctuations and may be helpful to preserve polarization where that is important. In some situations, a PM fiber may provide adequate stabilization since some sources in the modular components may not be properly aligned to polarization axes of a fiber.

In some examples, the interconnect 112 may be a single-mode (SM) optical fiber. An SM fiber may be more sensitive to polarization fluctuations, and in certain cases where use of PM fiber is precluded, steps may be taken to minimize polarization fluctuations. Since an SM fiber may be more affected by external factors, stabilization may help minimize polarization issues. In other examples, such as a vibrating or mechanically noisy environment, a fiber resting on a bench, for instance, may be more easily jostled or disturbed. In this scenario, the fiber may be encapsulated and to remove it from direct contact with the bench, ultimately isolating it from mechanical disturbances.

Figure 2:
FIG. 2 illustrates a measurement system using a fiber-optic interconnect stabilization apparatus, according to an example.

FIG. 2 illustrates a measurement system 100 using a fiber-optic interconnect stabilization apparatus 200, according to an example. An SM fiber may be used as the fiber-optic interconnect for the modular components of the ORL measurement system 100. A fiber-optic interconnection stabilization apparatus 200 may be used to encase the fiber-optic interconnect and reduce at least some adverse external conditions and influences, while maintaining its core function of connecting two intermodular measurement components or cassettes (e.g., 106a and 106b).

Figure 3:
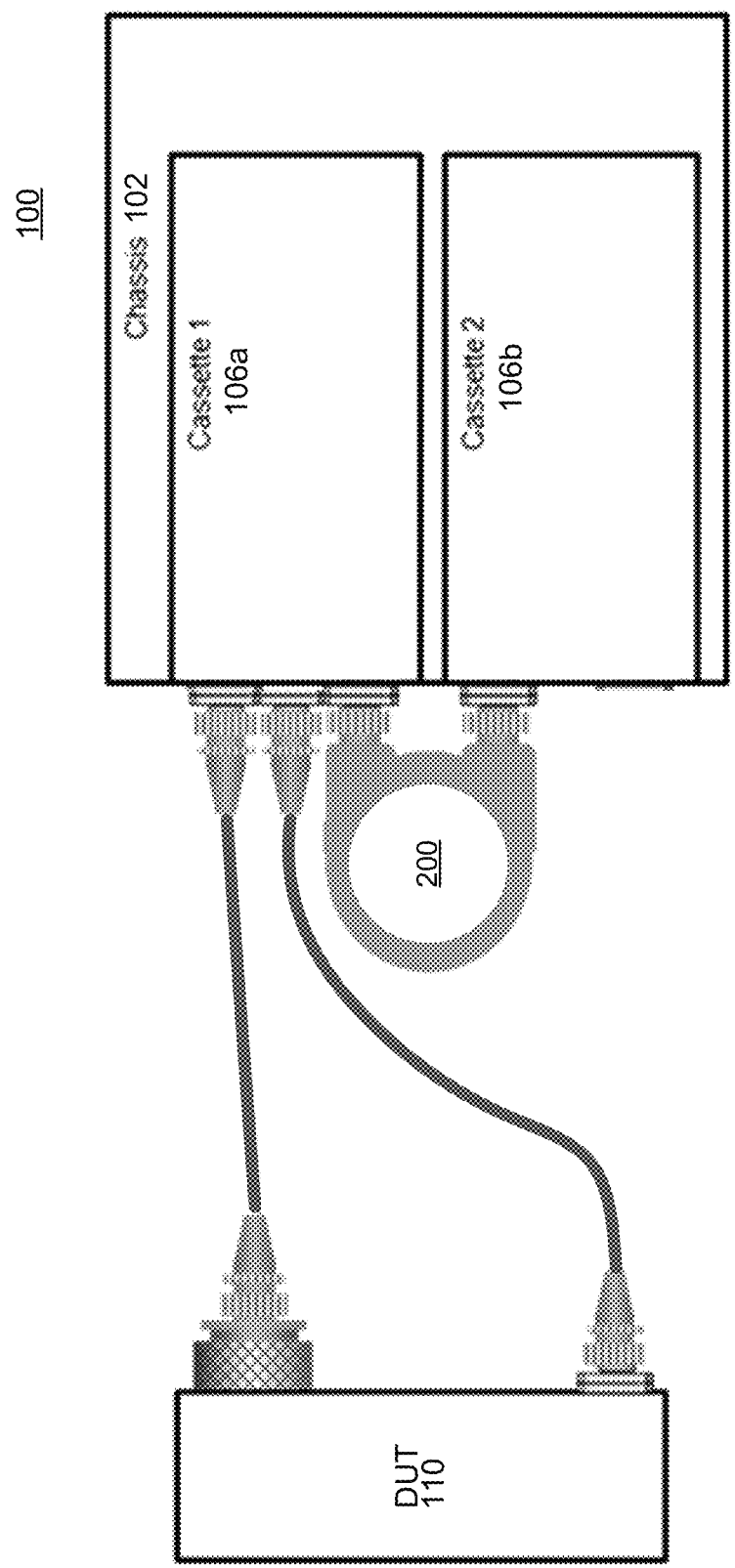
FIG. 3 illustrates a cross-section of a measurement system using a fiber-optic interconnect stabilization apparatus, according to an example.

FIG. 3 illustrates a cross-section of a measurement system 100 using a fiber-optic interconnection stabilization apparatus 200, according to an example. As shown in FIG. 3, a fiber-optic interconnection stabilization apparatus 200 may be used to effectively form a "rigid jumper" to form a closed measurement loop. The rigid jumper may be the fiber-optic interconnect stabilization apparatus that encases the fiber-optic interconnect cable that connects Cassette 1 106a and Cassette 2 106b. It should be appreciated that a DUT 110 (e.g., SM PCT/MORL) may be connected to the ORL measurement system 100 by other fiber-optic cables or jumpers, as shown. It should be appreciated that FIG. 3 may provide one exemplary configuration. Other various configurations and uses of the fiber-optic interconnection stabilization apparatus 200 and/or the DUT 110 may also be provided and are not intended to be limited by what is shown in FIG. 3.

Figure 4A:
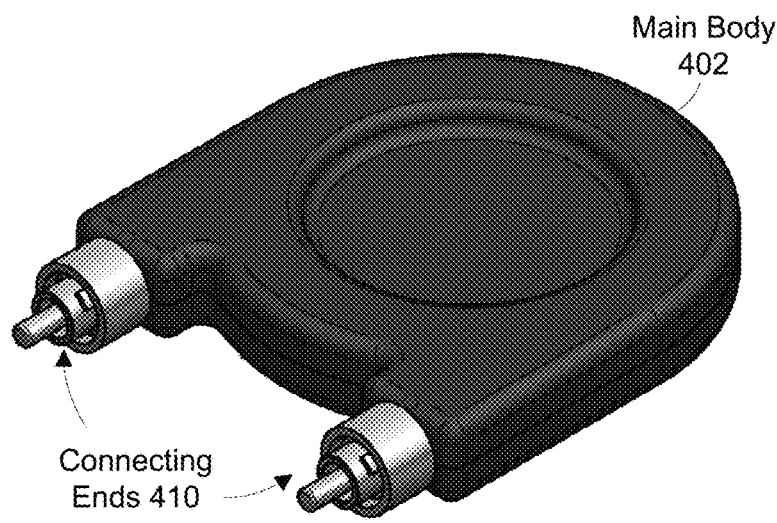
FIGS. 4A-4E illustrate various views of a fiber-optic interconnection stabilization apparatus, according to an example.
Figure 4B:
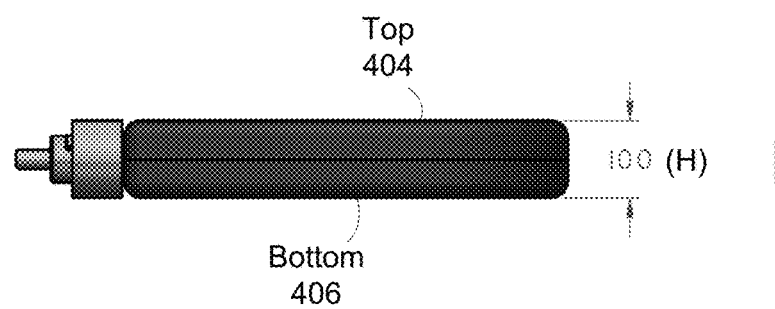

FIGS. 4A-4E illustrate various views of a fiber-optic interconnection stabilization apparatus 200, according to an example. FIG. 4A depicts an isometric view of a fiber-optic interconnection stabilization apparatus. FIG. 4B depicts a side view of a fiber-optic interconnection stabilization apparatus. In the side view, the fiber-optic interconnection stabilization apparatus may have a particular thickness or height (H) (e.g., 10 mm). As shown, the fiber-optic interconnection stabilization apparatus may have a main body 402 with an enclosure to contain a fiber-optic interconnect 112 in an organized way. The fiber-optic interconnection stabilization apparatus 200 may have an open configuration and a closed configuration. In order to have two such configurations, the fiber-optic interconnection stabilization apparatus 200 may have the capability to be opened and closed via mechanical, magnetic, electrical, or other feature. In an example, the main body may have two mating portions, e.g., a top portion 404 and a bottom portion 406. The top portion 404 and bottom portion 406 may be mechanically attached to enclose the fiber-optic interconnect 112. In one example, the top portion 404 and the bottom portion 406 of the main body 402 may be fully separated. In another example, the top portion 404 and the bottom portion 406 of the main body 402 may be attached at a joint (not shown). For example, there may be a hinge and a latch which may be used to open and close the main body 402, such as a clamshell design. In other examples, the top portion 404 and the bottom portion 406 of the main body 402 may be attached using epoxy or other similar materials. Other various configurations may also be provided.

In some examples, the main body 402 of the fiber-optic interconnection stabilization apparatus 200 may also include two openings 408. These openings may be configured to allow connecting ends 410 of the fiber-optic interconnect 112 to be fitted in the main body 402, such that when the fiber-optic interconnection stabilization apparatus 200 is in a closed configuration, the entire fiber-optic interconnection stabilization apparatus 200, together with the optical-fiber interconnect fitted within, becomes a rigid jumper rather than just a loosely dangling optical cable.

Figure 4C:
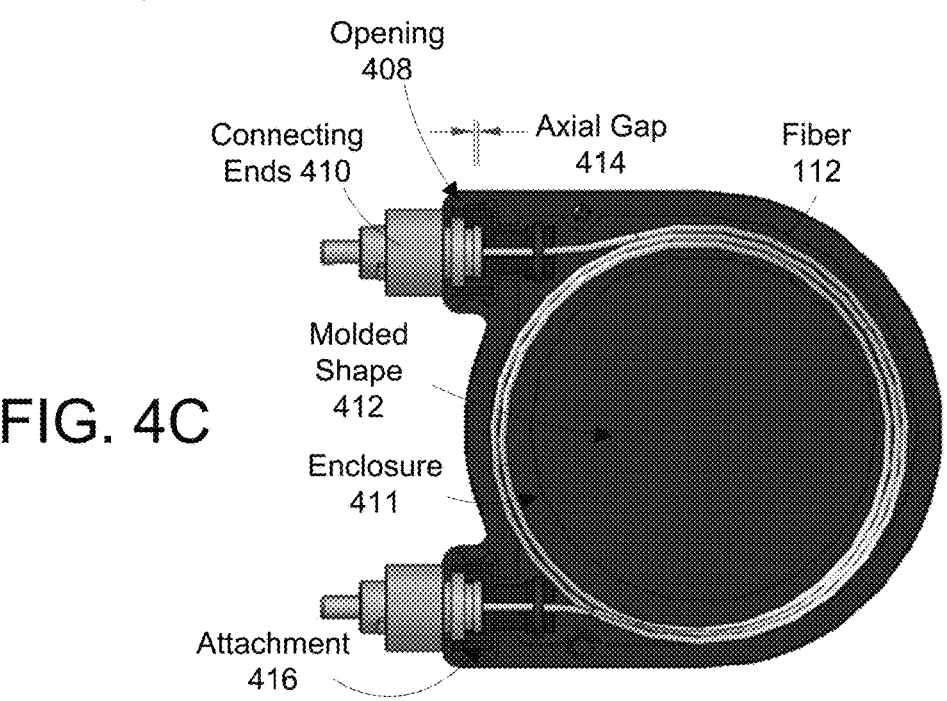

FIG. 4C depicts a top cross-section view of a fiber-optic interconnection stabilization apparatus 200. In this example, the fiber-optic interconnection stabilization apparatus 200 may be shown to have an SM fiber coiled in the enclosure of the main body 402. In one example, the interior of the main body may have a molded area 412 in the shape of a cylinder around which the fiber may be coiled. Other various designs may be provided to ensure organization or stabilization of the fiber within the main body 402. As shown, the fiber-optic interconnection stabilization apparatus 200 may have two openings 408 fitted to receive connecting ends 410 of a fiber-optic interconnect, such as an SM fiber. It should be appreciated that each opening 408 may have an axial gap 414 that is designed to fit each connecting end 410 of the fiber-optic interconnect 112 to help retain the connecting ends of the fiber and ensure stabilization of the fiber.

It should be appreciated that in the event the connecting end 210 does not fit exactly within the opening 408, various fittings or materials may be provided. For example, if a connecting end 410 is too small for the opening 408, an attachment 416 may be provided to ensure a stable fit. It should be appreciated that attachment 416 may come in a variety of sizes, shapes, and/or materials. In another example, if there is too much space in the enclosure 411 which allows the fiber 112 to move excessively, a padding (not shown) material may be inserted in the enclosure 411 to provide a more secure fit. Again, the padding may come in a variety of sizes, shapes, and/or materials. These and other various stabilization options may also be provided to ensure the fiber 112 is securely fitted within the main body 402 of the fiber-optic interconnection stabilization apparatus 200.

Figures 4D, 4E:
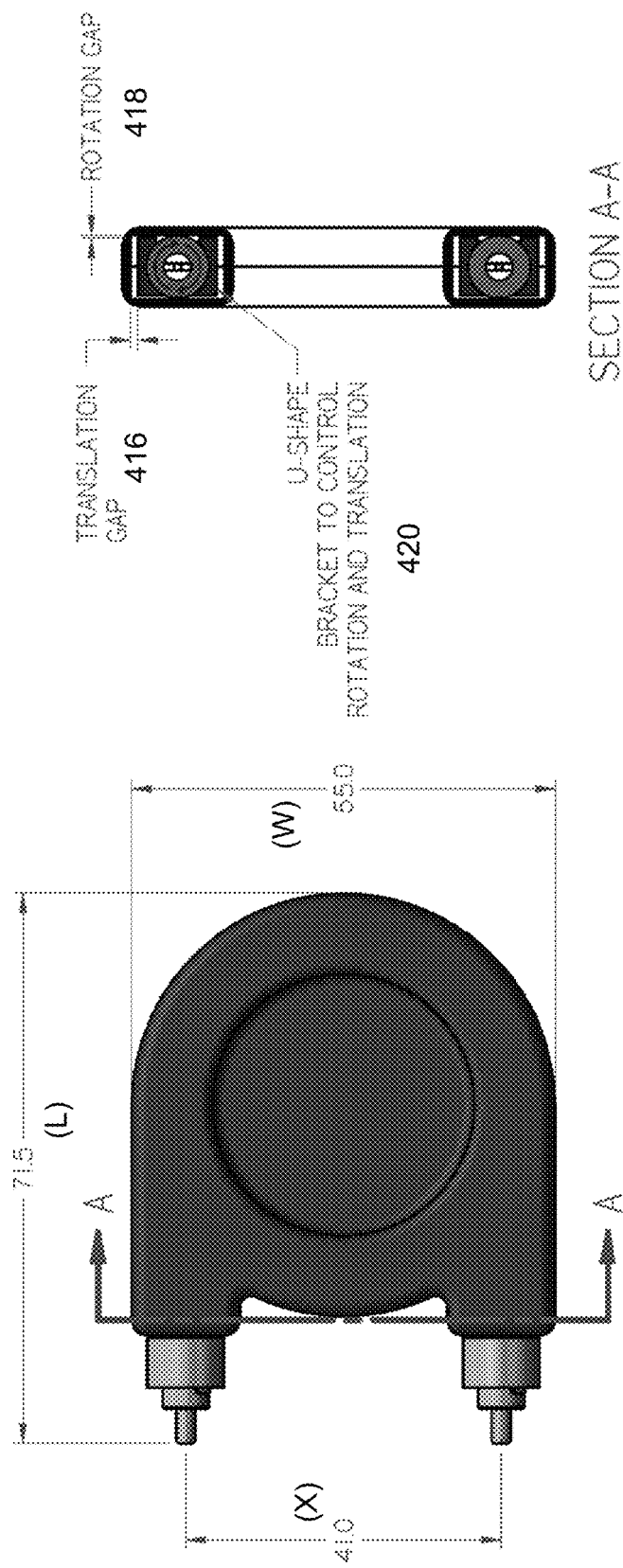

FIG. 4D depicts a top view of a fiber-optic interconnection stabilization apparatus 200 having exemplary dimensions. As shown, the fiber-optic interconnection stabilization apparatus 200, together with the encased fiber, may have a length (L) of 71.5 mm and a width (VV) of 55.0 mm, such that the connecting ends 410 of the protruding fiber-optic interconnect 112 may be 41.0 mm apart (X), which may be what is needed to close the measurement loop of the ORL measurement system. While specific dimensions are shown, it should be appreciated that other dimensions, lengths, and sizes may be provided depending on other needs of the measurement system or other implementations of the apparatus. Furthermore, it should be appreciated that while examples described herein are directed to depictions of two ports being used to connect two cassettes, other various may be provided as well. For instance, a fiber-optic interconnection stabilization apparatus 200 may be used in configurations with more than two ports interconnecting more than two cassettes as well.

FIG. 4E depicts a cross-section view A-A of the fiber-optic interconnection stabilization apparatus 200 shown in FIG. 4D. In FIG. 4E, the fiber-optic interconnection stabilization apparatus 200 may include a translation gap 416, a rotation gap 418, a u-shape bracket 420 to control rotation and/or translation. It should be appreciated that these configurations and designs may allow compatibility to different types of interconnects or connecting ends, as well as offer some flexibility of movement for the fiber-optic interconnection stabilization apparatus in the event the connecting ends of the fiber may not always line up with the ports of Cassette 1 and Cassette 2.

It should be appreciated that the fiber-optic interconnection stabilization apparatus 200, as described herein, may be made of various materials. In an example, the fiber-optic interconnection stabilization apparatus 200 may be made of metal (e.g., aluminum, etc.). A metallic material may allow a thermal mass associated with it. This may stabilize, integrate, and otherwise lessen thermal fluctuations as normally felt by an enclosed fiber. It should be appreciated that other materials for the fiber-optic interconnection stabilization apparatus 200 may also be provided, such as rubber, plastic, glass, carbon fiber, or other composites. Whatever materials are used, it should be appreciated that the fiber-optic interconnection stabilization apparatus 200 has some mechanical rigidity. As described herein, rigidity may help provide stability against polarization fluctuations caused by movement for non-PM fibers.

Figure 5C:
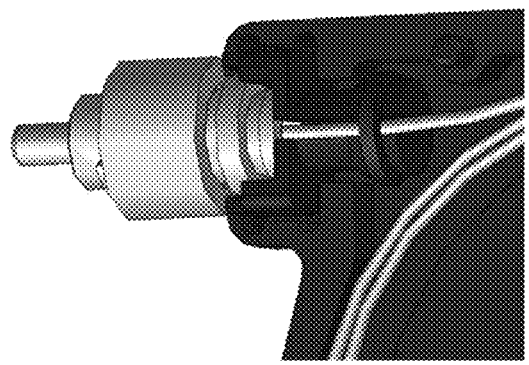
FIGS. 5A-5C illustrate various views of a fiber-optic interconnection stabilization apparatus, according to another example.
Figure 5B:
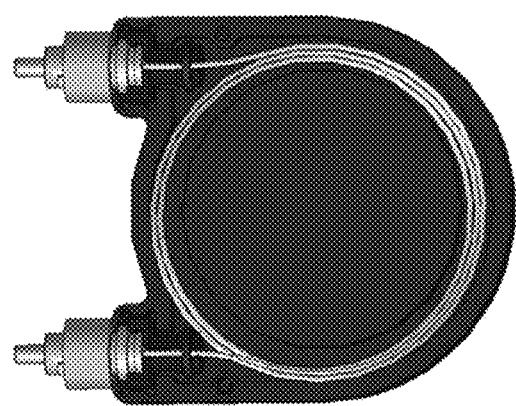
Figure 5A:

It should be appreciated that other configurations for a fiber-optic interconnection stabilization apparatus 200 may be provided. FIGS. 5A-5C illustrate various views of a fiber-optic interconnection stabilization apparatus 200, according to another example. In this case, the fiber-optic interconnection stabilization apparatus 200 may include a floating connector design. For example, the connecting ends may be fitted within the opening of the fiber-optic interconnection stabilization apparatus yet have some space or freedom to move sideways. Such movement may or may not include angular movement. In some examples, use of viscoelastic plastic, or other material, may be used to smooth out such spacing and minimize freedom of movement.

In some examples, a specific clocking angle may be provided for the fiber-optic interconnection stabilization apparatus on the connector. Alternatively or additionally, some ability to adapt the spacing for inter-cassette positional and angular tolerances may also be provided. These configurations may balance rigidity with flexibility (e.g., strict sagittal angular tol on the connector keying, but allow some flexibility in lateral displacement and azimuthal/elevation angles) that ultimately results in a fiber-optic interconnection stabilization apparatus 200 that may be more universally used for inter-cassette connections (or other connections) in various types of ORL measurement systems.

Ultimately, a fiber-optic interconnection stabilization apparatus 200 as described herein may stabilize a fiber-optic interconnect cable from mechanical, thermal, or other environmental stresses that affect ORL measurements. Thus, the fiber-optic interconnection stabilization apparatus 200 maximizes stability and provides improved IL/PDL/RL measurements by an ORL measurement system 100.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A method of using a fiber-optic interconnection stabilization apparatus in a measurement system, the method comprising:
   providing a main body comprising an enclosure and two openings, wherein the main body is in an open configuration or a closed configuration;
   encasing a fiber-optic cable within the enclosure of the main body in an organized manner, the fiber-optic cable having two connecting ends;
   fitting each of the two connecting ends of the fiber-optic cable to one of the two openings of the main body, wherein the two openings of the main body are separated by a predetermined distance such that the two connecting ends of the fiber-optic cable are separated by the predetermined distance and are exposed to provide interconnectivity between two adjacent modular components of the measurement system and form a closed measurement loop, and wherein the predetermined distance between the two openings of the main body matches a distance between ports of the two adjacent modular components; and providing stabilization to the fiber-optic cable inside the enclosure from external conditions when the main body is in the closed configuration.

2. The method of claim 1, wherein the main body comprises a top portion attached to a bottom portion to form the closed configuration of the main body.

3. The method of claim 1, wherein the main body has a clamshell design.

4. The method of claim 1, wherein an interior of the enclosure comprises a molded area around which the fiber-optic cable is organized.

5. The method of claim 4, wherein the molded area has a cylindrical shape around which the fiber-optic cable is to be coiled.

6. The method of claim 1, wherein the main body is formed of material that is at least one of metallic, rubber, plastic, carbon fiber, glass, and moldable material.

7. The method of claim 1, wherein the external conditions are at least one of mechanical, thermal, and environmental.

8. The method of claim 1, wherein each of the two openings comprises at least one of a translation gap, a rotation gap, an axial gap, and a u-shaped bracket to provide compatibility to different types of connecting ends and flexibility of movement within for the fiber-optic interconnection stabilization apparatus.

9. The method of claim 1, wherein the measurement system measures at least one of insertion loss (IL), optical return loss (ORL), polarization dependent loss (PDL), and extinction ratio (ER).

10. A method of making a fiber-optic interconnection stabilization apparatus in a measurement system, the method comprising:

providing a main body comprising an enclosure and two openings, wherein the enclosure of the main body comprises a top portion and a bottom portion, the top portion attached to the bottom portion to form a closed configuration of the main body, wherein:

the enclosure to encase a fiber-optic cable within the main body in an organized manner, the fiber-optic cable having two connecting ends; and each of the two openings of the main body to fit one of the two connecting ends of the fiber-optic cable from within the main body, wherein the two openings of the main body are separated by a predetermined distance such that the two connecting ends of the fiber-optic cable are separated by the predetermined distance and are exposed to provide interconnectivity between two adjacent modular components of the measurement system and a closed measurement loop, and wherein the predetermined distance between the two openings of the main body matches a distance between ports of the two adjacent modular components; and wherein the main body, when in the closed configuration, stabilizes the fiber-optic cable from external conditions.

11. The method of claim 10, wherein the main body is formed of material that is at least one of metallic, rubber, plastic, carbon fiber, glass, and moldable material, and wherein the enclosure comprises a molded area in a cylindrical shape around which the fiber-optic cable is coiled and organized.

12. The method of claim 10, wherein each of the two openings comprises at least one of a translation gap, a rotation gap, an axial gap, and a u-shaped bracket to provide compatibility to different types of the two connecting ends of the fiber-optic cable and flexibility of movement within for the fiber-optic interconnection stabilization apparatus.

13. The method of claim 10, wherein the measurement system measures at least one of insertion loss (IL), optical return loss (ORL), polarization dependent loss (PDL), and extinction ratio (ER).

* * * * *